J. M. FISHER.
ELECTRIC TOY MOTOR.
APPLICATION FILED NOV. 17, 1915.
1,232,673.
Patented July 10, 1917.
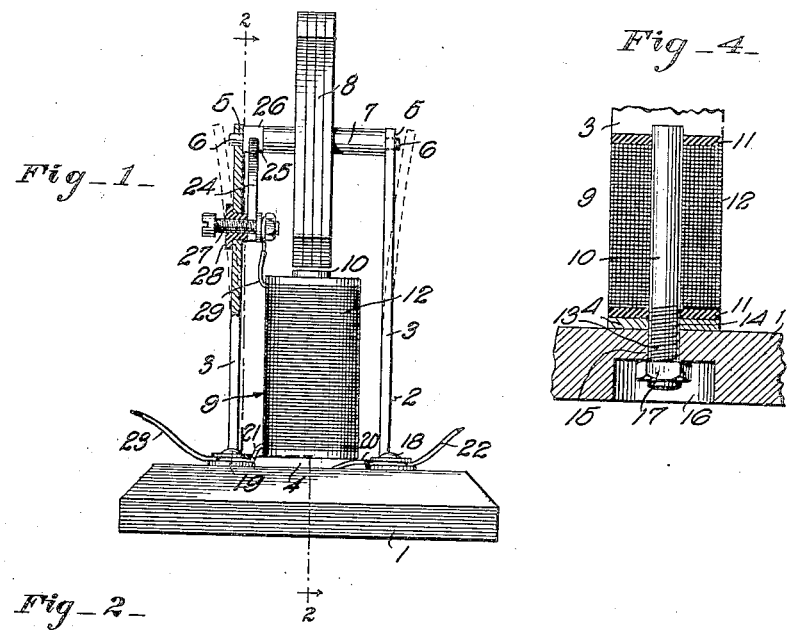
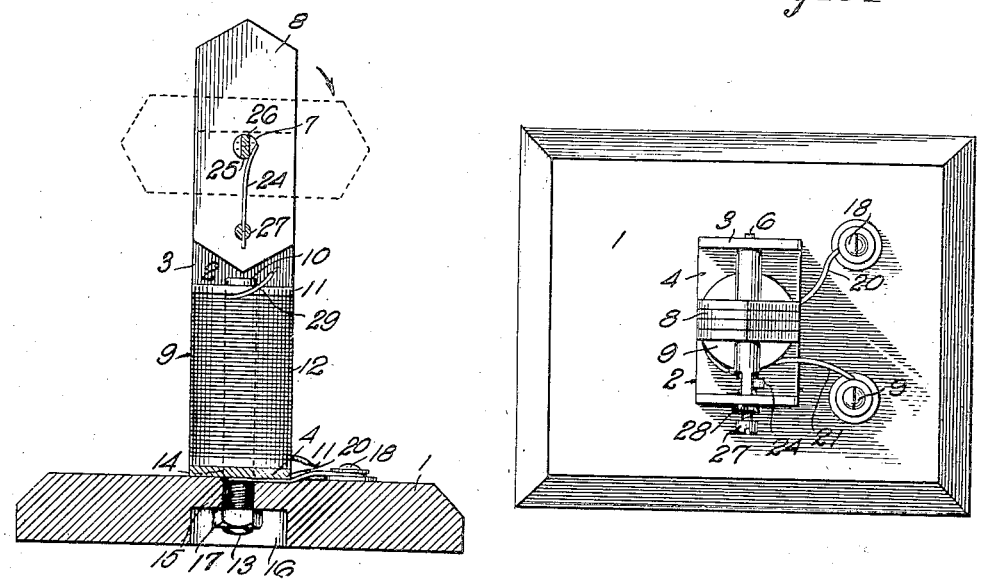
WITNESSES
Frank C. Palmer.
INVENTOR
Jay M. Fisher
BY
ATTORNEYS

UNITED STATES PATENT OFFICE.

JAY M. FISHER, OF BROOKLYN, NEW YORK.

ELECTRIC TOY MOTOR.

1,232,673.   Specification of Letters Patent.   Patented July 10, 1917.

Application filed November 17, 1915. Serial No. 61,969.

*To all whom it may concern:*

Be it known that I, JAY M. FISHER, a citizen of the United States, and a resident of the city of New York, borough of Brooklyn, in the county of Kings and State of New York, have invented a new and Improved Electric Toy Motor, of which the following is a full, clear, and exact description.

This invention relates to a class of toys, and deals particularly with electric motors.

The principal object of the present invention is to provide an extremely simple and cheap electric toy motor of novel construction and capable of developing a strong torque and high rotative speed.

A more specific object of the invention is to provide an electric motor of the single field pole type and with an unwound bar armature the shaft of which is mounted in a U-shaped frame, which frame is fastened to a base plate by a bolt which forms the core of the magnet, and the circuit of the magnet is intermittently made and broken by a switch that includes a spring contact carried by the frame and adapted to intermittently make contact with the armature shaft which is in circuit with the electromagnet.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is an elevation of the motor with a portion of the supporting frame in section to show the details of the make and break device;

Fig. 2 is a vertical section on the line 2—2, Fig. 1;

Fig. 3 is a plan view; and

Fig. 4 is a detail sectional view of the electromagnet to show the core thereof serving as means for fastening the magnet and armature supporting frame to a base plate.

Referring to the drawings, 1 designates a base plate on which is fastened a frame 2, such frame being a strip of metal bent into the form of a U so as to provide upright side members 3 united at their lower ends by a connecting portion 4. The upper extremities of the members 3 have apertures 5 for receiving the journals 6 of the shaft 7 that supports the laminated armature 8, such armature being in the form of a bar and rotatable in a plane parallel with the side members 3. The side members 3 of the supporting frame are resilient and can be bent outwardly as shown by dotted lines in Fig. 1, so that the journals 6 of the shaft can be engaged in the bearing openings 5.

The electromagnet 9 for causing rotation of the armature is disposed within the supporting frame 2 and it consists of a round bar 10 forming a core, disks or heads of insulation 11, and a winding 12. The disks 11 are washers of insulation having central openings of such size that they must be driven on the core 10, and then the wire 12 is wound in the space between the disks. The core has a threaded lower end 13 which passes through an opening 14 in the connecting portion 4 of the frame, and it also passes through an opening 15 in the base plate 1. The under side of the base plate is provided with a chamber 16 for accommodating the nut 17 on the threaded end of the core. The core thus becomes a bolt or fastener for securing not only the magnet to the base plate but the frame thereto.

On the base plate 1 are binding posts 18 and 19, and a wire 20 connects the binding posts 18 with the frame 2, so that the latter is in circuit, as is also the shaft 7. The terminal 21 of the magnet winding 12 is connected with the binding posts 19, and these binding posts can be connected with supply circuit wires 22 and 23, Fig. 1. The circuit is adapted to be intermittently opened and closed by a switch, which, in the present instance is shown as consisting of a spring contact or brush 24, the free end of which is adapted to engage with spaced contacting portions 25 and 26 on the shaft 7, these contacting portions being formed by milling the shaft, which is round, so that it will be of rectangular cross-section where the brush or contact 24 is adapted to engage the shaft. The brush makes contact with the shaft during approximately one-quarter of the revolution, as when the armature moves clockwise from the dotted to the full line position, and this armature moves by its momentum through another quarter of a revolution when contact is again made with the shaft. In this manner the circuit is intermittently made and broken. The brush is fastened to a screw or equivalent element 27 mounted in the frame 2 but insulated therefrom by a bushing 28. The terminal 29 of the magnet winding is connected with this screw.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A motor comprising an electromagnet winding, a rod extending through the winding to support the same and to form a pole-piece, one end of the rod extending beyond the winding and having a thread, a support having an aperture through which the threaded end of the rod extends, a nut on the threaded end for clamping the winding to the said support and for fastening the rod thereto, a frame having a base portion disposed between the support and winding and having an aperture through which the rod extends, whereby the latter also serves to hold the frame on the support, an armature carried by the frame in coöperative relation with the end of the said rod opposite from that fastened to the support, and a make and break device in circuit with the winding and having a part rotatable with the armature.

2. A motor comprising a U-shaped frame having side members, a shaft having journals at the ends thereof, there being apertures in the extremities of the members of the frame for receiving the journals, and the members being laterally yieldable to permit the journals to be engaged with and disengaged from the members of the frame by the latter being sprung apart, an armature on the shaft, a field magnet fastened to the frame and disposed between the members thereof in coöperative relation with the armature, a make-and-break device between one end of the winding of the field magnet and the frame for making and breaking the circuit as the shaft turns, and an external circuit connected with the frame and with the other end of the field magnet winding.

In testimony whereof I have signed my name to this specification in the presence of two subscribing witnesses.

JAY M. FISHER.

Witnesses:
C. BRADWAY,
PHILIP D. ROLLHAUS.